(12) United States Patent
Frank (10) Patent No.: US 6,375,284 B1
(45) Date of Patent: Apr. 23, 2002

(54) CABINET

(75) Inventor: Manfred Johannes Frank, Auckland (NZ)

(73) Assignee: Manfred Frank Patent Holdings Limited (NZ)

( * ) Notice: Subject to any disclaimer, the term of this patent is extended or adjusted under 35 U.S.C. 154(b) by 0 days.

(21) Appl. No.: 09/485,918

(22) PCT Filed: Aug. 12, 1998

(86) PCT No.: PCT/NZ98/00119

§ 371 Date: Feb. 15, 2000

§ 102(e) Date: Feb. 15, 2000

(87) PCT Pub. No.: WO99/08575

PCT Pub. Date: Feb. 25, 1999

(30) Foreign Application Priority Data

Aug. 15, 1997 (NZ) ................................. 328561
Mar. 26, 1998 (NZ) ................................. 330046

(51) Int. Cl.⁷ .............................................. F16B 12/20
(52) U.S. Cl. ...................... 312/140; 312/257.1; 52/280
(58) Field of Search ............................. 312/257.1, 263, 312/265.1, 265.2, 140, 108, 111, 265, 107; 52/280, 282.1, 656.9

(56) References Cited

U.S. PATENT DOCUMENTS

| 3,836,217 A | * | 9/1974 | Shiina | 312/257.1 X |
| 4,281,883 A | * | 8/1981 | Zacky | 312/257.1 X |
| 4,840,440 A | | 6/1989 | Dieter | 312/140 |
| 4,891,923 A | * | 1/1990 | Ericsson et al. | 52/280 |

FOREIGN PATENT DOCUMENTS

| AU | 124690 | | 7/1947 | |
| CH | 565952 | * | 8/1975 | 52/280 |
| DE | 2533961 | | 2/1977 | |
| GB | 691915 | | 5/1953 | |
| WO | WO 92/21574 | | 10/1992 | |

* cited by examiner

Primary Examiner—James O. Hansen
(74) Attorney, Agent, or Firm—Blakely Sokoloff Taylor & Zafman (57) ABSTRACT

A cabinet which is demountable. Walls (11) of the cabinet (10) are joined edge to edge by join elements (12). At the apex (15) of each intersection of the walls there is a retainer (14). The retainers (14) prevent the joiner elements from being removed. One of the retainers which is the last to be installed when the cabinet is assembled is lockable. The retainer (16) needs to be unlocked and removed before any of the joiner elements (12) and retainer elements (14) can be removed to disassemble the cabinet.

31 Claims, 7 Drawing Sheets

CABINET

BACKGROUND OF THE INVENTION

The present invention relates to a cabinet but more particularly a display cabinet.

Display cabinets used commonly in museums, art galleries, trade fairs and the like are generally bulky and difficult to assemble. Ease of assembly and transportation issues are especially important when the display cabinet is required to be constantly moved around to different locations within the museum or 'on the road' in the case of travelling exhibits.

Prior-cabinets have been heavy and often do not have features which make them accessible while maintaining the exhibit safely and securely within the cabinet. For example it has been known for screws to mysteriously disappear one by one over time until a panel can be removed and an item from within likewise mysteriously disappears. Aesthetics/style are also important when designing furniture to be in use in a museum or art gallery environment. Cabinets which meet the desired aesthetic appeal are expensive while those which can offer cost and functional assembly benefits are not suitable for the stylised environment or can inhibit clear viewing of articles within the cabinet.

SUMMARY OF THE INVENTION

It is therefore an object of the present invention to provide a cabinet which is relatively lightweight, can be easily assembled, transports conveniently and will have an aesthetically pleasing appearance.

In one broad aspect of the invention there is provided a cabinet including a plurality of wall (or panel) members, each wall member including at least one grooved or slotted edge adapted to be conjoined to an edge of an adjacent wall member by a joining element.

According to a further broad aspect of the invention there is provided a cabinet including a plurality of wall elements, each wall element having an inner surface and an outer surface, an edge of a first wall element being conjoined with the edge of a second and adjacent wall element by a joining element, said joining element having spaced apart engagement means slidingly engaged in a groove or slot in respect of the edges of the first and second wall elements to a retention position thereby preventing the edges from being drawn apart.

According to yet a further broad aspect of the invention there is provided a demountable cabinet including wall elements forming side walls, a base or floor and a top wall, said wall elements having side edges, adjacent side edges of adjacent wall elements being coupled by a joining element, said joining element having a pair of spaced apart engagement means slidingly engaged in respect of grooves formed in the adjacent wall elements, said joining elements being prevented, once in a joining position, from removal by a retaining element located at an apex formed by adjacent ends of the joining elements.

DETAILED DESCRIPTION OF THE PREFERRED EMBODIMENTS

The following describes and the drawings illustrate particular embodiments of the present invention. It should be appreciated that other variations and combinations in shape and configuration may be possible without straying from the scope of the invention.

Figure 1A:
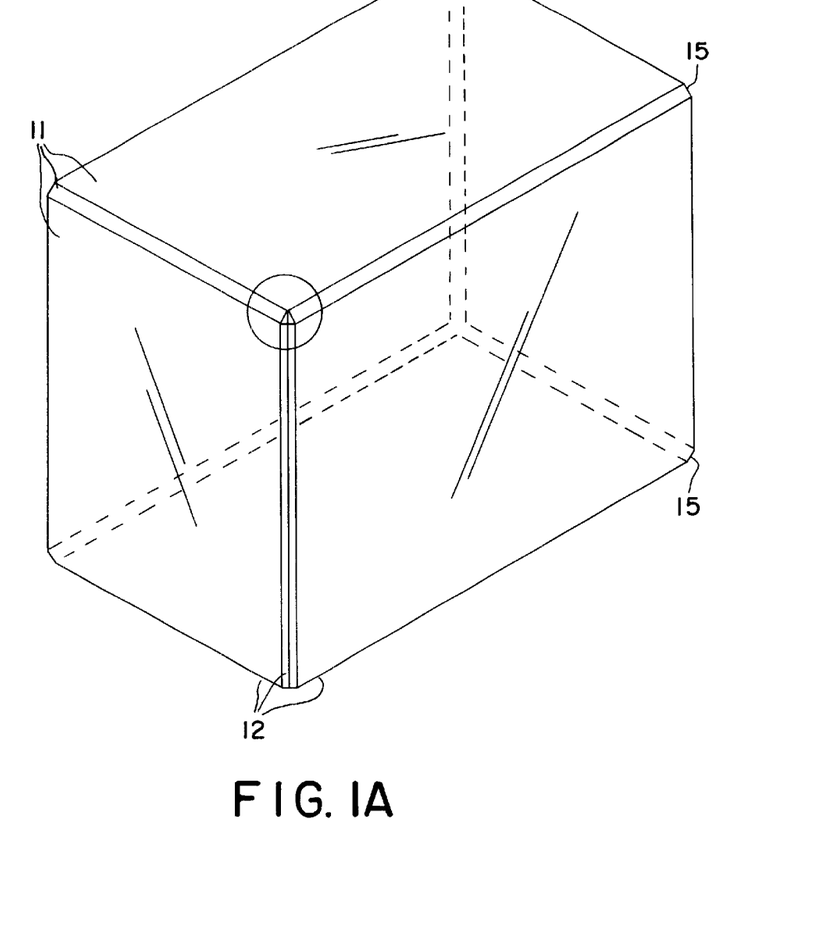
FIG. 1 is a general view of the cabinet according to the invention showing one corner detail.
Figure 1B:
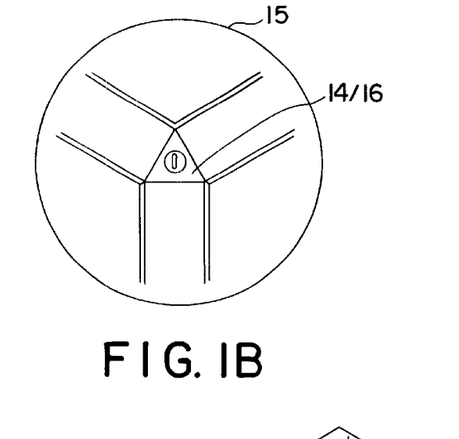

In the preferred form of the invention as illustrated the cabinet 10 is comprised of a plurality (in this case six) forming side walls, a bottom or base wall and a top wall. The panel members 11 are joined edge to edge at their peripheral edges by elongate joiner elements 12 (there are twelve such elements, one at each edge—see FIG. 1). The detail of the interconnection of the adjacent side edges of panel members 11 by a joiner element 12 is best seen in FIGS. 2 and 3.

The periphery or side edge of each panel member 11 features a sloping edge portion 11a (best seen in FIGS. 2 and 3) where the preferred angle of slope is 45° to the inner face surface of the panel member. Between sloping edge 11a and what forms in the final cabinet construction the external face surface of panel 11 is located a groove or slotted channel 11b extending substantially perpendicularly to the external face surface of panel 11. This slotted channel 11b, allows a joining element 12 to join two adjacent panel members 11 as will be hereinafter described.

Figure 2:
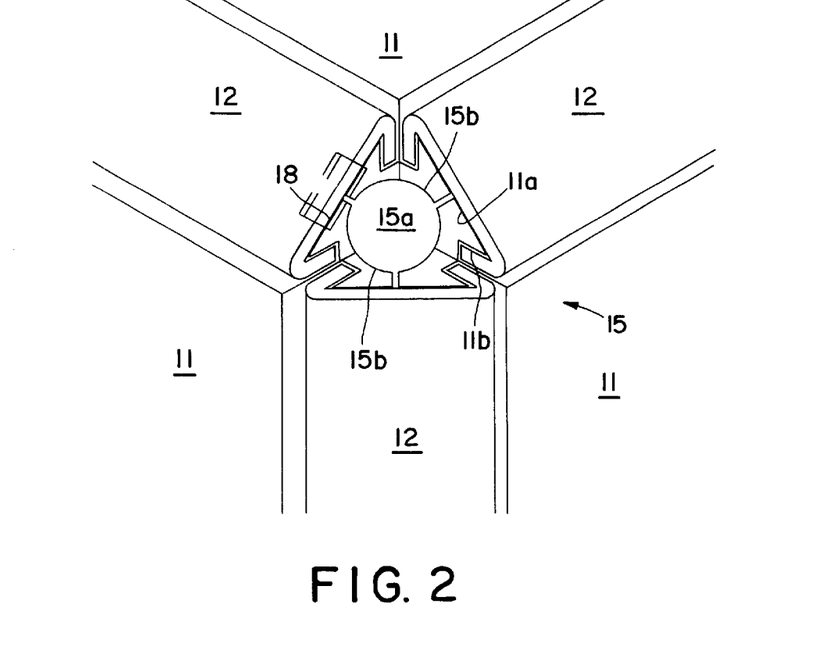
FIG. 2 is a general view of a corner of the assembled cabinet but with a retaining insert removed.

As can be seen in FIG. 2, the joiner element is of generally channel shape with opposing side edges 12a.

Figure 3:
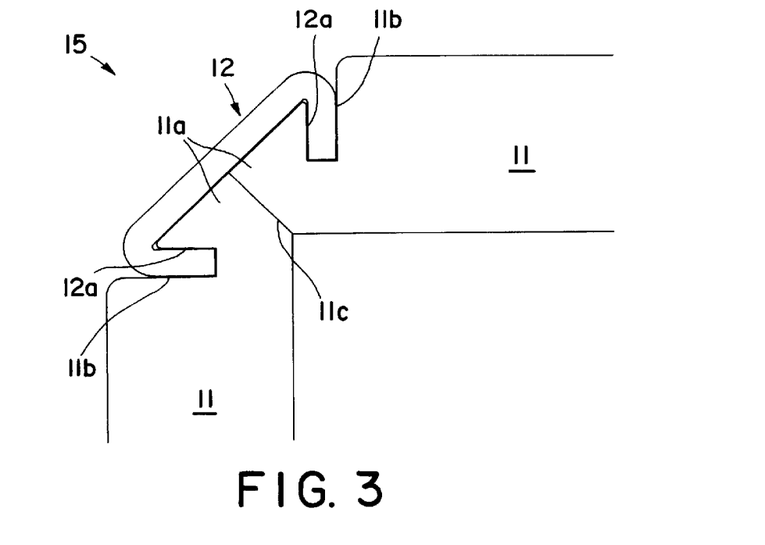
FIG. 3 is a cross-section view of the connecting method for joining the cabinet wall or panel elements.

The joining method is best illustrated by FIG. 3 where the inwardly angled edges 12a of the joining element 12 'capture' two panel members 11 by sliding an edge 12a into a corresponding slotted channel 11b, of the adjacent side edges of the panels 11. To make this possible an inner slope 11c, on each panel 11 allows the adjoining panels to contact but not interfere with one another in forming a 90° corner (like that shown in FIG. 3). The actual corner is effectively smoothed off by the joining element 12 which provides both a safety and desirable aesthetic feature of the cabinet 10 when assembled.

Further embodiments which require other shapes may have corresponding changes in the angles of slopes 11a, 11c, and edges 12a.

The corner 15 construction is best illustrated by FIG. 2. There will be eight such corners on a box-shaped cabinet 10 with substantially the same appearance.

A bore or aperture 15a is provided within the recess of each corner construction 15 (the congregation point or apex of three panel members 11 and three joining elements 12) to provide an anchoring site for a retaining plug or corner insert 14 (best seen in FIGS. 4 and 5, 6 and 7 or 9 to 10).

Figure 4:
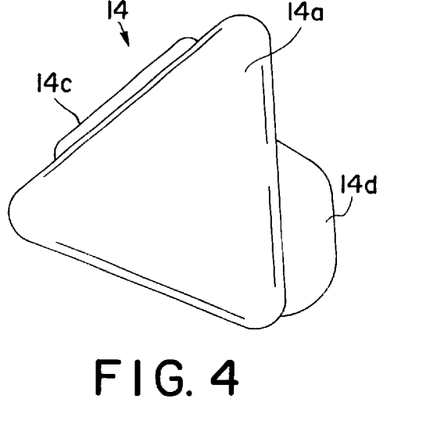
FIG. 4 is a general view of a retaining insert for corner insertion.
Figure 5:
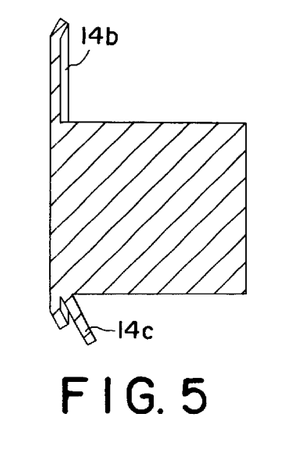
FIG. 5 is a cross-section elevation view of a retaining insert.
Figure 6:
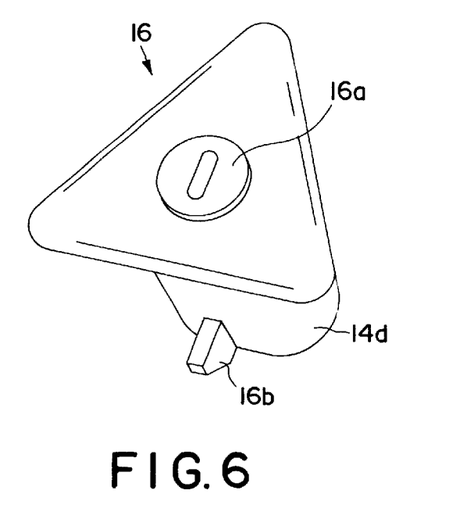
FIG. 6 is a general view of a corner retaining insert with lock function.
Figure 7:
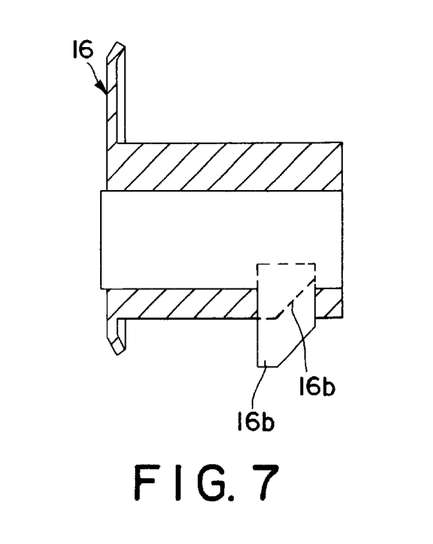
FIG. 7 is a cross-section elevation view of a lockable retaining insert.

Bore 15a is, according to the form illustrated in FIGS. 4 and 5, preferably circular so a matching shaft 14d formed by the body of the insert 14 can locate within the bore. Bore 15a is formed by recesses 15b provided in the corners of each of the three adjacent panel members 11 at the corner.

The detail of one form of corner insert 14 is shown in FIGS. 4 and 5. An insert 14 includes a face 14a and a body or shaft 14d adapted to be inserted in bore 15a. Face 14a is triangular and is sized to cover the recess of corner 15 by an overhang 14b at its edges. One side of the insert 14 is provided with a 'bottom lip' 14c which is received by a corresponding recess or clearance 18 in panel members 11.

The function of lip 14c/recess 18 is to secure an insert 14 in position when a joining element 12 slides over it (engaging the back wall of the lip groove 14e). The insert 14 cannot be pulled out of corner construction 15 due to it held in a locked-in position by the lip 14c being held in recess 18 by the overlapping end of joining element 12.

Seven of the eight corners 15 will have an insert 14 in position. The eighth corner features a lock insert 16 (shown in FIGS. 6 and 7). Lock insert 16 is substantially similar in appearance to an insert 14 with the addition of a lock cylinder 16a and lug 16b which prevents withdrawal of the lock insert 16 from bore 15a. The lip 14c is not present on lock insert 16.

The sequence of applying inserts 14 and the lock insert 16 is important for the assembly of a secure cabinet 10. The sequence will be apparent during assembly to ensure lips 14c/recess 18 secure each of the seven inserts 14 in place. The lock insert 16 is inserted into the final remaining bore 15a (preferably, but not necessarily, on the upper side of cabinet 10) and the key removed to allow the lug 16b to protrude and locate behind an inner edge of a panel 11 to maintain the lock insert 16 in recess 15a.

Lock insert 16 and inserts 14 prevent sliding of joining elements 12 to demount or disassemble the cabinet and hence unauthorised entry into the display cabinet 10. Once a key is located in the key lock 16a of lock insert 16 the lug 16b retracts and the lock insert 16 can be removed. This then enables joining elements 12 terminating at the cavity (corner 15) from which the lock insert 16 has been removed to be slid out of the grooves 11b. This in turn frees the lip 14c of the inserts at the ends of the grooves 11b, from which joining elements 12 have been removed so that the inserts 14 can be extracted. As a result further joining elements 12 are freed for sliding removal. This procedure is continued until the cabinet is broken down into its component parts of panels 11, inserts 14, lock insert 16 and joining elements 12.

The reverse procedure is followed to assemble the cabinet from its broken down (ie storage, transportation) state.

Other embodiments may utilise some form of non-return clip to secure a corner insert 14 but this requires access from within the cabinet for disassembly to take place.

Figure 12:
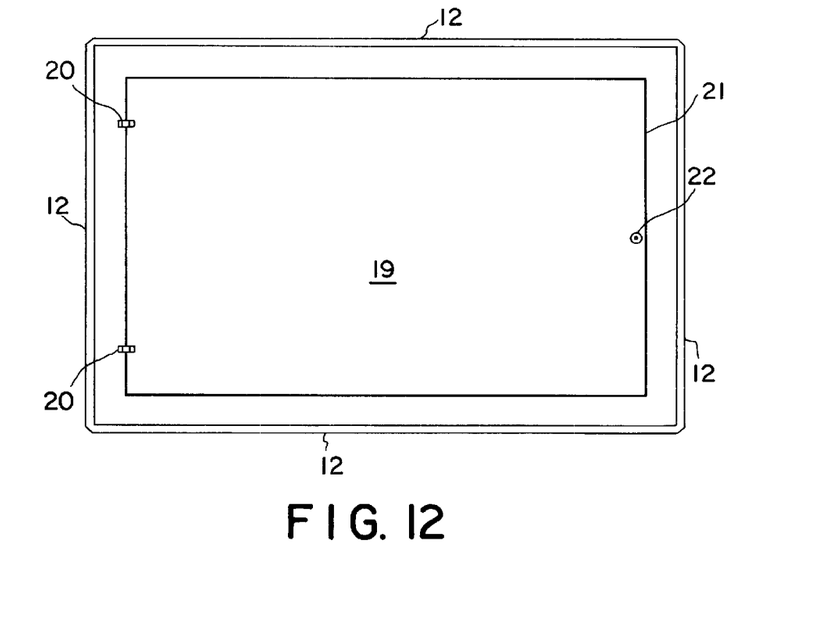
FIG. 12 is a face view of a cabinet according to the present invention incorporating a door.
Figure 13:
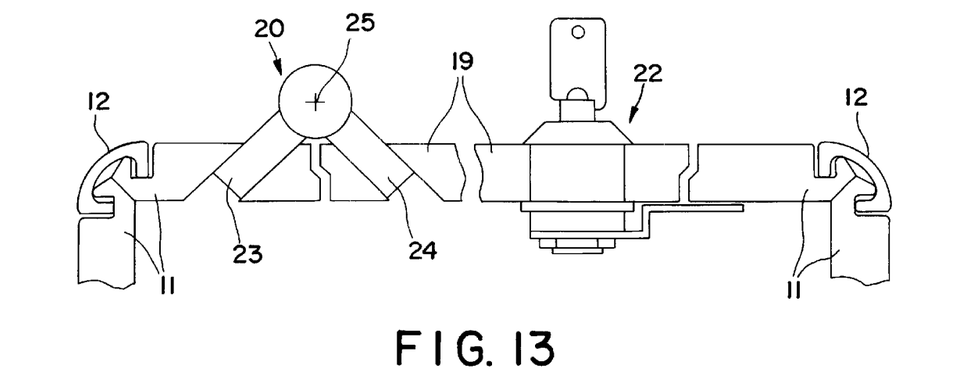
FIG. 13 is a sectioned view through a part of the cabinet showing the door construction.

In another embodiment access may be gained by having a door 19 hinged by hinges 20 in an opening 21 in a wall element 11 and which is secured with an appropriate lock 22 (see FIGS. 12 and 13). The hinge can be in the form of studs, pins or the like 23 and 24 which are joined together to pivot about a pivot axis 25. The studs 23 and 24 are engaged in respective openings formed in the wall element 11 and door 19 as shown in FIG. 13. It will also be noted that the adjacent edges of the opening 21 and door 19 are profiled as shown in FIG. 13.

Alternative embodiments may include provision for integral shelving affixed to the panel walls or corner constructions.

Figure 8:
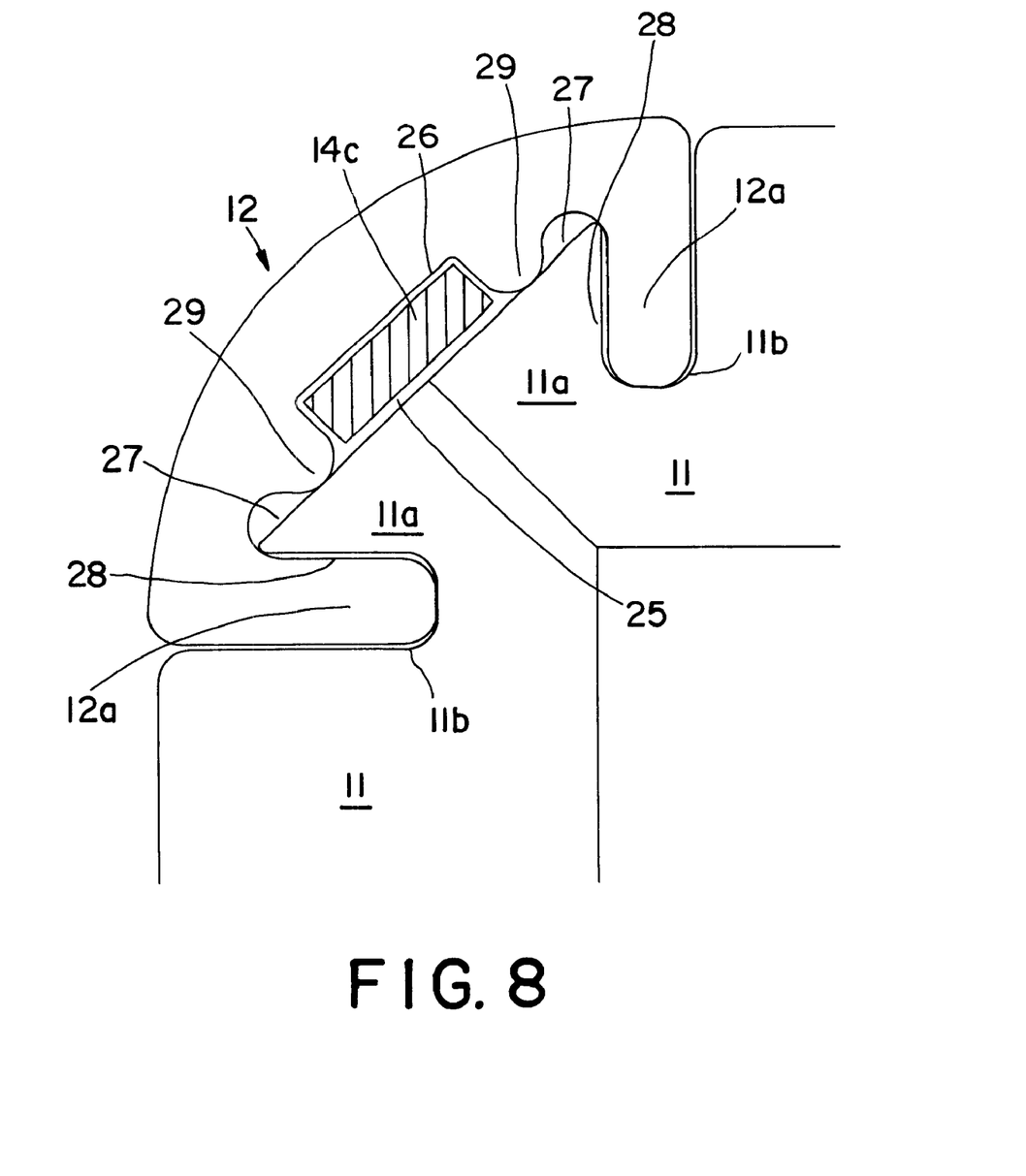
FIG. 8 is a similar view to FIG. 3 but showing an alternative embodiment of the joining element and profile of the abutting peripheral edges of the panels.
Figure 9:
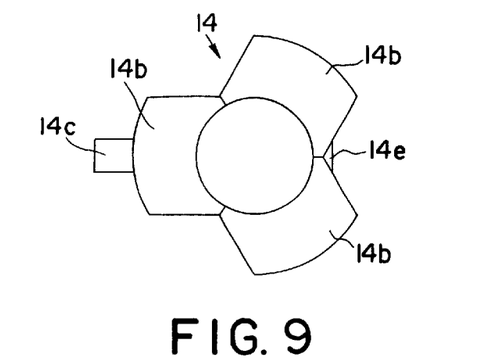
FIG. 9 is a plan view of an alternative version of the retaining insert.
Figure 10:
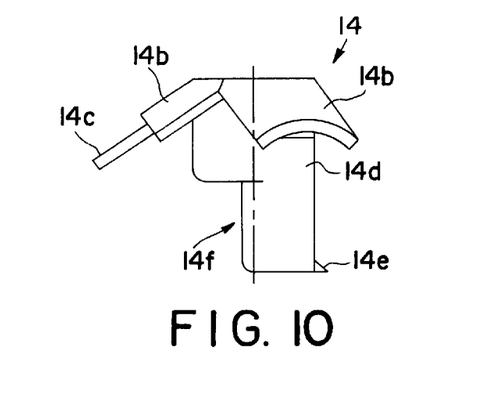
FIG. 10 is an elevation view of the retaining insert of FIG. 9.
Figure 11:
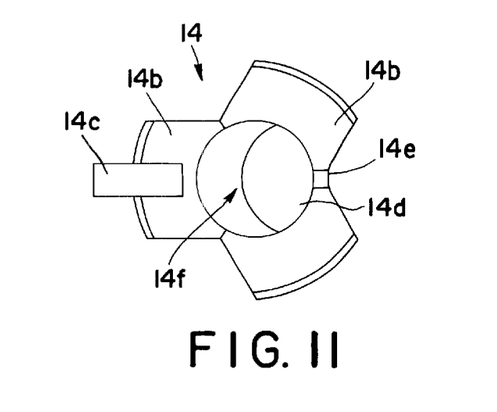
FIG. 11 is an underside plan view of the retaining insert of FIGS. 9 and 10.

An alternative cross-section of joiner element 12 and configuration of the profiled edges of the panels is shown in FIG. 8 while FIGS. 9, 10 and 11 show a modified form of the insert which is able to be used with the arrangement shown in FIG. 8.

In the arrangement shown in FIG. 8 the elongate joining element 12 is essentially the same as that shown in FIG. 3 except in cross-sectional profile the joiner element is of curved shape. This provides a clearance 25 between the inside surface 26 of the joining element 12 and the end surfaces 27 of the panel members 11 to accommodate a lip or projection 14c of the insert 14. This projection 14c can be of circular cross-section as shown in FIG. 8 or it can preferably be of a more angular construction as shown in FIGS. 9–11.

Also, in the arrangement shown in FIG. 8 the side edges 12a include inwardly projecting bulbous portions 28. Projections 29 also extend from the inner surface of the joining element 12 to engage on the surface of edge portions 11a.

In FIGS. 9–11 there is shown an alternative insert 14 where like elements of construction carry the same reference numerals as those used for the embodiment of FIGS. 4 and 5. In this embodiment the face 14a is slightly different by having three separate overhangs 14b rather than a continuous overhang as with the previous embodiment. Each of the overhangs 14b corresponds with and mates against the end surface of an adjacent joining element 12 (this preferably being of the cross-sectional profile as shown in FIG. 8).

The insert of FIGS. 9–11 is intended to provide greater security to prevent unauthorised dismantling of a cabinet. To achieve unauthorised dismantling it is possible with the earlier described embodiment to lever up an insert 14 at one is corner sufficient to enable the adjacent end of a joining element 12 to be moved underneath the overhang 14b. This longitudinal sliding movement of the joining element 12 can be sufficient to cause the opposite end of the joining element to move away from its overlap with lip 14c thereby enabling the insert at the opposite end of the joining element to simply be removed. With the removal of this insert it is then possible to sequentially remove joining elements 12 and hence other inserts 14 followed by further joining elements so as to breach or dismantle the cabinet.

With the arrangement shown in FIGS. 9–11, however, the overhangs 14b are made as short as possible ie. to terminate as close as possible to the shaft 14d. As a consequence even if an insert 14 is levered or prised sufficiently to enable a joining element to be slid longitudinally, the end of the joining element will immediately come into contact with the insert, more particularly shaft 14d, such contact taking place before the opposite end of the sliding element can clear the lip or projection 14c. Consequently it is not possible to remove the insert at the opposite end of the moved joining element. As a result the security of the cabinet is improved.

To further prevent an insert 14 from being removed the inner end of body 14d is provided with a radial projection 14e and a cutaway portion 14f. When assembling the cabinet the body 14d is inserted into aperture 15a on an angle (permitted by the clearance provided by cutaway portion 14f) to enable radial projection 14e to locate behind the inner surface of the wall members at the corner or apex 15. Once projection 14e is in place the body is straightened into the aperture 15a so that projection or tongue 14c locates in recess 18. Thus, if a leverage force is applied to the outer end of insert 14 the radial projection engages against the wall member to prevent the body 14d from moving axially within the aperture 15a sufficient for insert 14 to be removed.

Figure 14:
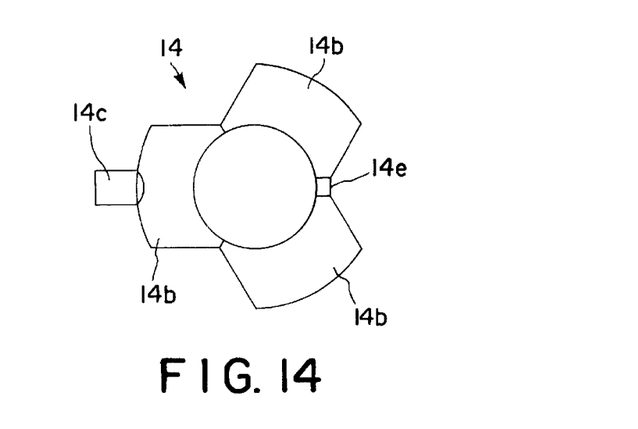
FIGS. 14–16 are further plan elevation and underside plan views of a further form of the retaining insert.
Figure 15:
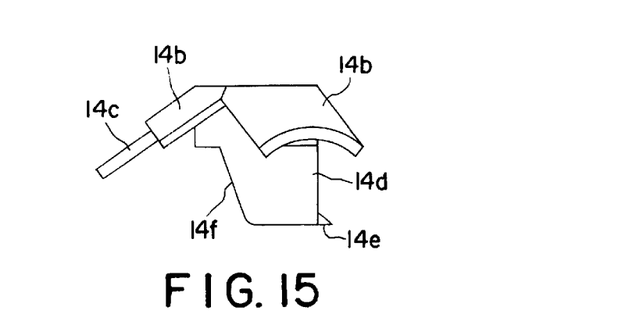
Figure 16:
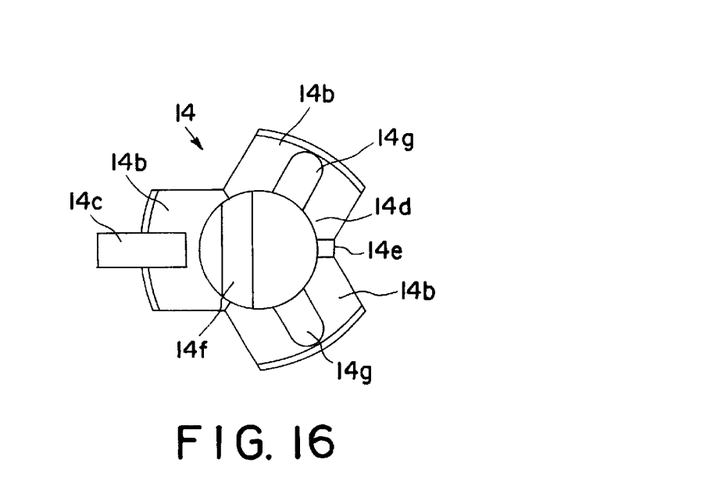

FIGS. 14–16 show yet a further form of the insert which is similar to that shown in FIGS. 9–11. However, longer overhangs 14b are provided. To prevent the action referred to in connection with the insert of FIGS. 9–11 the two overhangs not incorporating projection 14c are provided on their undersides with a ridge 14g. Thus, if an insert is levered or prised outwardly the presence of the rib 14g nevertheless prevents sliding action of the joining element from taking place.

In use the cabinet system may be transported in 'flat pack' form and then constructed on site. The construction will be apparent from the components provided.

Joiner elements 12 are slotted into wall panels 11 at their peripheral edges to form a box. Seven corner inserts 14 are added during this procedure. Finally insertion of the lock 16 completes and secures the cabinet. The final construction of the cabinet will maintain the display item securely within its walls. A considerable effort would be needed for a thief to break into the cabinet and in a public viewing area such a thief would have little or no opportunity to break in.

The basic invention (of interlocking panel members) provides the opportunity for constructing shapes other than boxes for display purposes. For example, a hexagon or octagon shape may be desirable for a 'walk-around' display cabinet where an item or collection of items can be viewed from all angles.

Preferably the panels, and shelves (if any), are constructed from a transparent plastic material such as acrylic to enable an unobscured view of a display item from any position outside the cabinet. It must be appreciated however, that small additions of colour may be used to match the surrounding colour scheme. For example one or more of the panels can be coloured and opaque.

Joiner elements 12 are preferably constructed from polished stainless steel strips and units can then be cut to length. Stainless steel has an appropriately 'high-grade' appearance. Alternatively, the joiner elements can be of extruded metal form, eg aluminium. In a further form the joiner elements could be of extruded plastic material such as polycarbonate which may be clear.

Corner inserts may be constructed of coloured plastics material or in a transparent manner in conformance with the panel members.

The lock will be similarly of plastic construction with an appropriately sized lock.

Stands or tables for a cabinet may be constructed using the same inventive principal or be of conventional design. The purpose of a stand or table is merely to raise the height of the cabinet to a comfortable viewing level.

For secure fixing of the table to the cabinet the 'floor' panel member 11 may be provided with holes for screwing/bolting it to a table top. The construction material of the 'floor' panel need not be the same as the other panels because the transparency is not required.

The cabinet according to the present invention is thus (by virtue of its materials) lightweight, can be transported and assembled easily and has an attractive appearance equal to or surpassing other available display cabinets which are much more expensive. The cabinet is readily demountable for storage and/or transportation purposes.

What is claimed is:

1. A cabinet including a plurality of wall members, each wall member having an inner surface and an outer surface, an edge of a first wall member being conjoined with the edge of a second and adjacent wall member by a joining element, said joining element having spaced apart engagement portions slidingly engaged in a groove or slot in edges of the first and second wall members to a retention position thereby preventing the edges from being drawn apart, a removable retaining element engaged at adjacent corners of said first and second wall members to prevent movement of the joining element from said retention position, each retaining element including a projection which is engagable between an end of a joining element and an edge of at least one of the wall members joined by the joining element, a body which is engagable in an aperture provided at a corner formed by adjacent edges of said adjacent wall members, and at least one overhang at one end of said body, said overhang when the retaining element is located in its retention position, being located opposite an adjacent end of the joining element.

2. A cabinet as claimed in claim 1 wherein the groove or slot in the edge of the wall member opens toward the outer surface thereof and the grooves or slots in the edges of adjacent wall members joined by a joining element open toward the outer surfaces in a divergent direction.

3. A cabinet as claimed in claim 2 wherein the edge of the wall member has a face surface which is at an angle to the inner surface other than at right angles, said face surface of respective edges of adjacent wall members being located substantially face to face when said respective edges are joined by said joining element.

4. A cabinet as claimed in claim 1 wherein the joining element is of channel shape with side walls thereof inwardly convergent.

5. A cabinet as claimed in claim 1 wherein the wall members are of plastic construction and each joining element(s) is of metal construction.

6. A cabinet as claimed in claim 5 wherein the joining element is of extruded metal form.

7. A cabinet as claimed in claim 5 wherein the wall members form the sides, base or floor and top of the cabinet.

8. A cabinet as claimed in claim 5 wherein at least one of the wall members is transparent.

9. A cabinet as claimed in claim 1 wherein the retaining element which, when assembling the cabinet is the last to be installed, is lockable in position.

10. A cabinet as claimed in claim 1 wherein the body includes a radial projection.

11. A demountable cabinet including wall members forming side walls, a base and a top wall, said wall members having side edges, adjacent side edges of adjacent wall members being conjoined by a joining element, said joining element having a pair of spaced apart engagement elements slidingly engaged in grooves formed in the adjacent wall members, each said joining element being prevented, once in a joining position, from removal by a retaining element engaged in an apex formed by intersecting of conjoined side edges, an aperture formed at a said apex, said retaining element having a body portion, one end of which is engagable in said aperture, the retaining element having overhangs at a second end of the body portion, said overhangs locating opposite ends of the joining elements at said apex, the retaining element further having a projection engaged in a clearance between a said joining element and at least one of the side edges conjoined by the joining element.

12. A demountable cabinet as claimed in claim 11 wherein the wall members are of plastic material, said grooves being formed in the plastic material to extend inwardly from an outer surface of each wall member such that the grooves of adjacent side edges are divergently disposed relative to one another.

13. A demountable cabinet as claimed in claim 12 wherein the joining element is of extruded metal form having a generally channel shape with side walls thereof inwardly convergent, said side walls forming said engagement elements.

14. A demountable cabinet as claimed in claim 12 wherein at least one plastic wall member is transparent.

15. A demountable cabinet as claimed in claim 11 wherein at least one retaining element includes a locking mechanism.

16. A demountable cabinet as claimed in claim 11 further including a lockable door in one wall member.

17. A demountable cabinet having at least side walls, a base wall and a top wall, each pair of adjacent edges of the side walls and each pair of adjacent edges of the side walls and the respective base wall and top wall being joined together by a joiner element slidingly engaged with each said pair of adjacent edges, a retainer element located at each apex formed by a pair of adjacent side walls and the top wall and a pair of adjacent side walls and the base wall to substantially prevent the joiner elements from sliding movement, each retaining element includes a retaining projection which engages between a joiner element and a part of at least one wall, a body which is engaged in an aperture formed at said apex, and a body projection which engages internally in the cabinet with a part of at least one wall.

18. A cabinet as claimed in claim 17 wherein the last to be installed of the retainer element when the cabinet is assembled is lockable in position.

19. A cabinet as claimed in claim 17 wherein the joiner element has a pair of convergent flanges each of the convergent flanges being slidingly engaged in a groove or slot in an edge of each of the walls joined by the joiner element.

20. A cabinet as claimed in claim 19 wherein the walls are of plastic material with the grooves or slots formed in profiled edges.

21. A demountable enclosed body created by a plurality of separate walls and a plurality of joining elements, the separate walls being conjoined edge to edge, each edge to edge conjoining including a joining element joining two conjoined edges of the walls together, each corner of the enclosed body formed by intersection of a plurality of the conjoined edges includes an aperture and a plug inserted therein, each said plug forming an abutment to prevent any substantial sliding movement of the joining elements from occurring when the enclosed body is in the assembled state and each of all but at least one of the plugs interengages with one of the adjacent joining elements.

22. A body as claimed in claim 21 wherein said at least one plug is lockable to retain the plug in the aperture.

23. A body as claimed in claim 21 wherein said each of all but at least one of the plugs includes a locking tongue, said locking tongue being located between a surface formed by one of the pair of conjoined edges and a part of the joining element engaged with said one of the pair of conjoined edges.

24. A body as claimed in claim 23 wherein the plug includes a body portion which is engaged in the aperture, said body portion including a radial projection which projects oppositely to the locking tongue and which engages with an internal surface of at least one of the walls.

25. A body as claimed in claim 23 wherein the plug includes a body portion which is engaged in the corner, the body portion having a plurality of overhangs each of which locates opposite an end of a joining element to present an abutment surface of the joining element.

26. A body as claimed in claim 25 wherein the body portion includes a radial projection which projects oppositely to the locking tongue and which engages with an internal surface of the enclosed body.

27. A body as claimed in claim 24 or 26 wherein the body portion of the plug includes a rebated portion at a side of the body portion opposite to that from which the radial projection projects.

28. A body as claimed in claim 25 wherein one of said overhangs includes a projecting tongue which is located between a surface formed by one of the conjoined edges and a part of the joining element engaged with said one of the conjoined edges.

29. A cabinet as claimed in claim 21 wherein a groove is formed in each of the conjoined edges, the grooves being arranged to extend in a convergent manner relative to the interior of the enclosed body, the joining element including a pair of side edges which are slidingly engaged with the grooves.

30. A body as claimed in claim 29 wherein the conjoined edges engage in an interface which is located between the grooves.

31. A body as claimed in claim 21 wherein the walls are formed from a plastic material and the joining element is of extruded metal construction.

* * * * *